Patented July 17, 1934

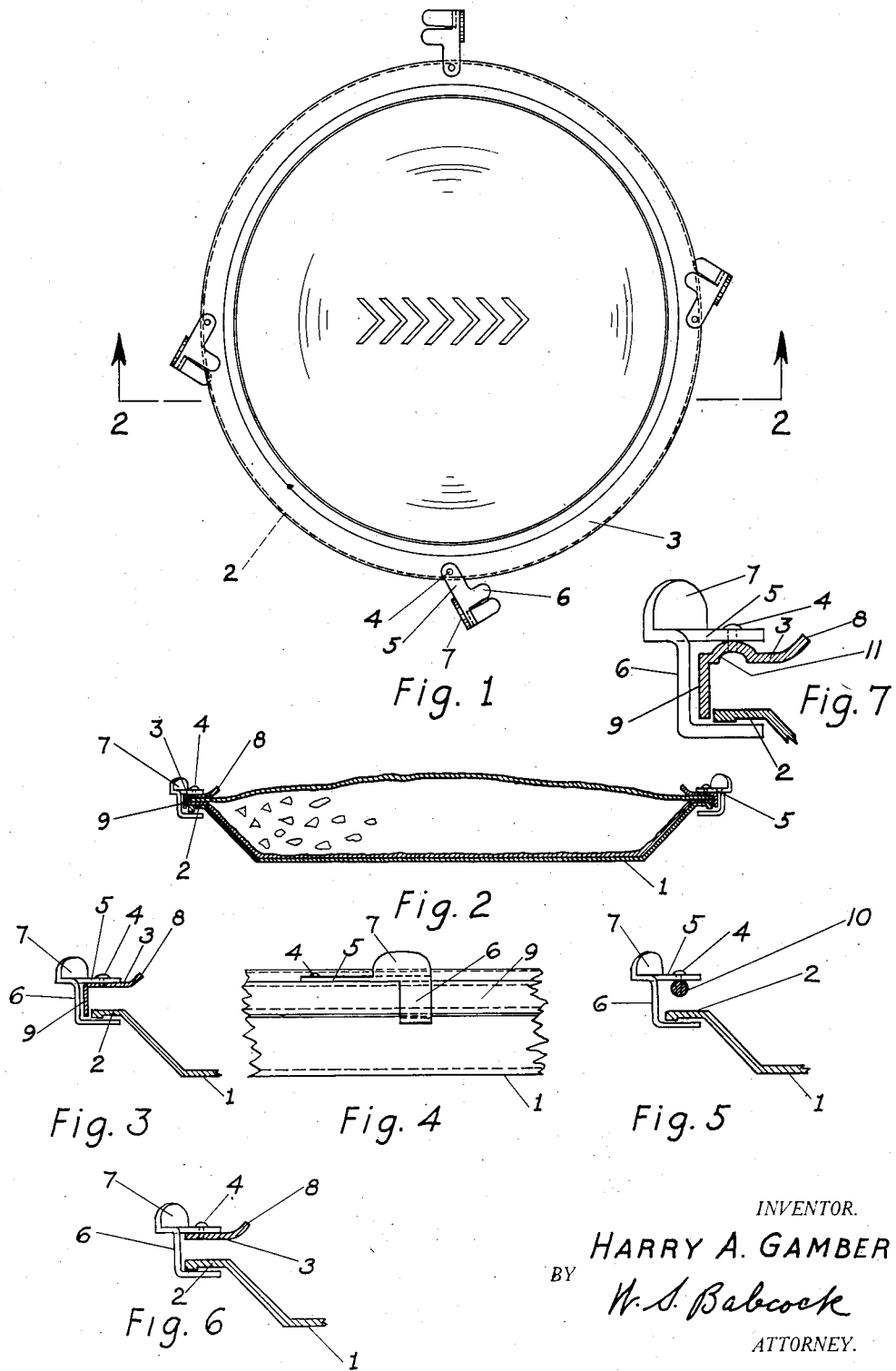

1,966,497

UNITED STATES PATENT OFFICE 1,966,497

CLAMP DEVICE FOR PIE PANS

Harry A. Gamber, Sandusky, Ohio

Application February 23, 1933, Serial No. 657,977

3 Claims. (Cl. 53—6)

The invention to be hereinafter described relates to clamp devices for pie pans.

At present the regular method of baking pies is to cover or line the pie pan with pie crust dough, put in the selected filling, put on the top layer of pie crust dough, crimp the edges, and bake. Crimping is resorted to as a safe guard against the separation of the edges of the crusts and leaking out of the contents by "boiling over" when the steam and gases accumulate within the pie. Actually, the crimping is not usually, sufficient. Vents are provided in usual and well known manner to relieve the pressure, and permit escape of the steam and gases. House wives, bakers, and all others thoroughly familiar with baking, recognize the fact that crimping, alone, does not really hold and that the vents very frequently become clogged. With present pie baking pans, the filling very frequently "boils over" and spills out between the edges or crusts, making bad messes on the oven floor and coating the pan edges. The whole ensemble is unsightly and unattractive, although the pie, itself, may be the best that "mother" ever baked. It is common practice, of course, when a pie starts to "boil over" and leak out at the edges, to cut down the oven heat or move it to a cooler place in the oven. This prevents thorough and complete baking of the lower dough layer or bottom crust, as will be readily understood and is one general and well known reason for "soggy", wet, or half baked bottom pie crusts.

The present invention avoids all of these above and other objections and provides a simple, efficient, compact and inexpensive means for preventing leakage through the edge of the pie between the dough layers or crusts and, at the same time, insures a complete and thorough baking or cooking of the lower dough layer or bottom crust. It may be quickly manufactured in large quantities, and may be applied quickly and readily to any ordinary pie pan of well known make and construction. There is absolutely not the slightest alteration or change in the construction of the pan and no parts permanently secured to the pan. The device may be used with any one of a number of pans of the same approximate outside diameter. For instance, a house wife may have two dozen pie pans and only one or a few of these devices—enough of them, to provide one for each of any number of pans which she might, normally, use at any one time. If she frequently baked six pies at one time, she would have six such devices, so that all pans could be similarly provided and all used at one time, or together.

In order to more clearly disclose the construction, operation and use of the invention, reference should be had to the accompanying drawing forming part of the present application. Throughout the several figures of the drawing, like reference characters designate the same parts in the different views.

In the drawing:—

Fig. 1 is a top plan view of the preferred form of the invention, applied;

Fig. 2 is a cross section on line 2—2 of Fig. 1;

Fig. 3 is an enlarged fragmentary detail cross section showing one clip or catch in operation;

Fig. 4 is a corresponding fragmentary side elevation;

Fig. 5 is a view similar to Fig. 3, showing a modification;

Fig. 6 is a view similar to Fig. 3, showing a second modification; and

Fig. 7 is an enlarged detail cross section, similar to Fig. 3, showing the anchoring groove in the ring 3.

Referring to the drawing in detail, 1 indicates the usual pie pan of well known shape and construction and provided with the regular flat or horizontal radially directed flange 2. The pan here shown is the one most regularly and generally used—a tin or metal pan. It will be understood, of course, that it may be "Pyrex" or any other suitable material. In the preferred form of the invention, a thin, flat, annular ring 3 of metal or other suitable material is provided. This ring, preferably, is of substantially the same measurements as the flange 2 and adapted to be superposed thereon. At intervals about its edge, clips or latches are connected to it by pivots 4. Other means of connection between the ring and clips may be used, providing movement of the clips, relatively to the ring. Each clip has an arm 5 by which it is connected to the ring. Such arm carries the U-shaped clip or catch 6 at its free end, adapted, when in operating position, to receive the edges of the flange 2 and ring 3. For easy handling, the arm 5 of each clip, is provided with a wing, ear, or other projection 7 by which it may be gripped or swung. When these clips are swung to operative position to engage the ring and flange, they hold the two together, as will be clearly seen. Of course, the branches of the U's are so spaced that they just snugly receive between them the flange 2, ring 3 and intervening dough layers or pie dough crusts. Since ring 3 is continuous, it provides a complete and continuous ring clamp, holding the edges of the two dough layers or pie crusts closely together and completely sealing the joint, making leakage of any kind impossible. With the ring clamp securely held in operative position, the contents of the pie can not "boil over" between the crust edges. Steam and gases generated by the heat will be forced to pass out through the vents provided for that purpose through the top crust, in well known manner. As a further complete assurance of the tight sealing of the edges of the dough of the crusts, ring 3 is provided with one or more grooves 11, or the like. For clearness, it is not shown in any of the other views of the drawing, except Fig. 7, which is enlarged more for that purpose. Its application in the other views will be clearly understood from Fig. 7. Preferably, a single circumferential groove is provided and is curved upwardly in the ring, in cross section, to a depth approximately equal to the thickness of the metal of the ring. It will be understood that the groove may be somewhat deeper or somewhat shallower, as desired. Likewise, the radial width or cross section, may vary, as desired. There may be more than one continuous groove, it may be concentric with relation to the ring, or it may be eccentric, it may extend upwardly or downwardly (concave or convex), and it may be a succession of short grooves with ungrooved sections between. Or instead of grooves, the material of the ring may be formed with small projections upwardly or downwardly. The simpler and preferred form, is a single continuous groove, as shown in Fig. 7. It acts as would a groove when pressed into any soft material, it forces the material to take the complementary shape—to form a bead. In Fig. 5, the lower rounded surface of the rod 10 operates in general in the same way, only in the opposite direction. It acts as would a groove formed oppositely to that shown in Fig. 7. Actually, in the form in Fig. 7 the dough crust material is forced into the groove in the form of a rib and, as the pie bakes, it becomes a rib of relatively hard material. With a reverse groove, the downwardly directed part really becomes a rib. This rib, like the lower rounded portion of rod 10, embeds itself in the dough and, as the pie bakes, the edge beyond the rib is higher or thicker than the crust between the pan edge and clamp. From the above, it will be seen that the groove, rib, rounded wire, or other corresponding part acts as an anchor. It embeds itself in the dough or the dough is compressed into it. Then, as the pie bakes, the crust is firmly and positively held. In this way the pie crust dough is securely and positively anchored by the clamp and forms a part of the holding means, fully cooperating with the clamp.

To avoid possible cutting, tearing, or puncturing of the pie crust where it is clamped by the ring, the inner edge is deflected upwardly or inclined away from the crust, as clearly shown in Fig. 2. Or it may be rounded, tapered, or offset, as desired.

To quickly and accurately put the ring in operative position, a depending flange 9 is provided which fits down about and around the pie pan flange in just the same way that a pot or pan cover fits over the pot or pan, as will be readily seen on reference to Fig. 2. Of course, the details of the clips 6 may be varied. As shown, the two branches or arms of the U are not directly opposite, as in the letter U. They may be, if desired. Also, they are shown as substantially parallel. This is not essential. They may either diverge or converge, slightly. The clip, as shown, is of sheet metal. It may be of wire, for instance, or other suitable material. Again, the flange 9 may or may not be at right angles to the clamping or gripping part of the ring 3, as may be desired.

In the form in Fig. 5, a simple rod or wire 10, round in cross section is shown in place of ring 3, and in Fig. 6 the modification simply omits the centering flange 9.

In operation, after the pie has been put in pan 1, with the edges of the top and bottom dough layers or crusts extending across the flange 2 and trimmed to the edges, the clamp ring 3 or 9 is placed over the flange 2 and on the edge of the top layer or crust. The clips 6 will then, of course, all be in the inoperative position, as two of them are shown in Fig. 1. The clips will then all be swung to operative positions for holding, as the remaining two are shown in Fig. 1. The pie is then ready to be slipped into the oven and is securely held against any leakage.

It is believed that the construction, operation and use of the invention will be clear from the preceding detailed description.

Many changes may be made in the construction, arrangement and disposition of the various parts of the invention, within the scope of the appended claims, without in any way departing from the field and scope of the invention, and it is meant to include all such within this application, wherein only one preferred form and two modifications have been disclosed, purely as illustrative and with no thought or intention to in any way limit the invention thereby.

Having thus described my invention, what I claim and desire to protect by Letters Patent, is:—

1. A clamping device for pie pans comprising an annular member adapted to engage the upper surface of the edge of a pie crust and provided with a radially curved surface adapted to impress said crust to form a positive anchor of said crust to said device, and means for securing said device in operative position.

2. A clamping device for pie pans comprising an annular member adapted to engage the upper surface of the edge of a pie crust and provided with a circumferentially extending radially curved surface adapted to impress said crust to form a positive anchor of said crust to said device, and means for securing said device in operative position.

3. A clamping device for pie pans comprising an annular member adapted to engage the upper surface of the edge of a pie crust and provided with a circumferentially extending radially curved concavo-convex surface adapted to impress said crust to form a positive anchor of said crust to said device, and means for securing said device in operative position.

HARRY A. GAMBER.